United States Patent Office 3,370,226
Patented Feb. 20, 1968

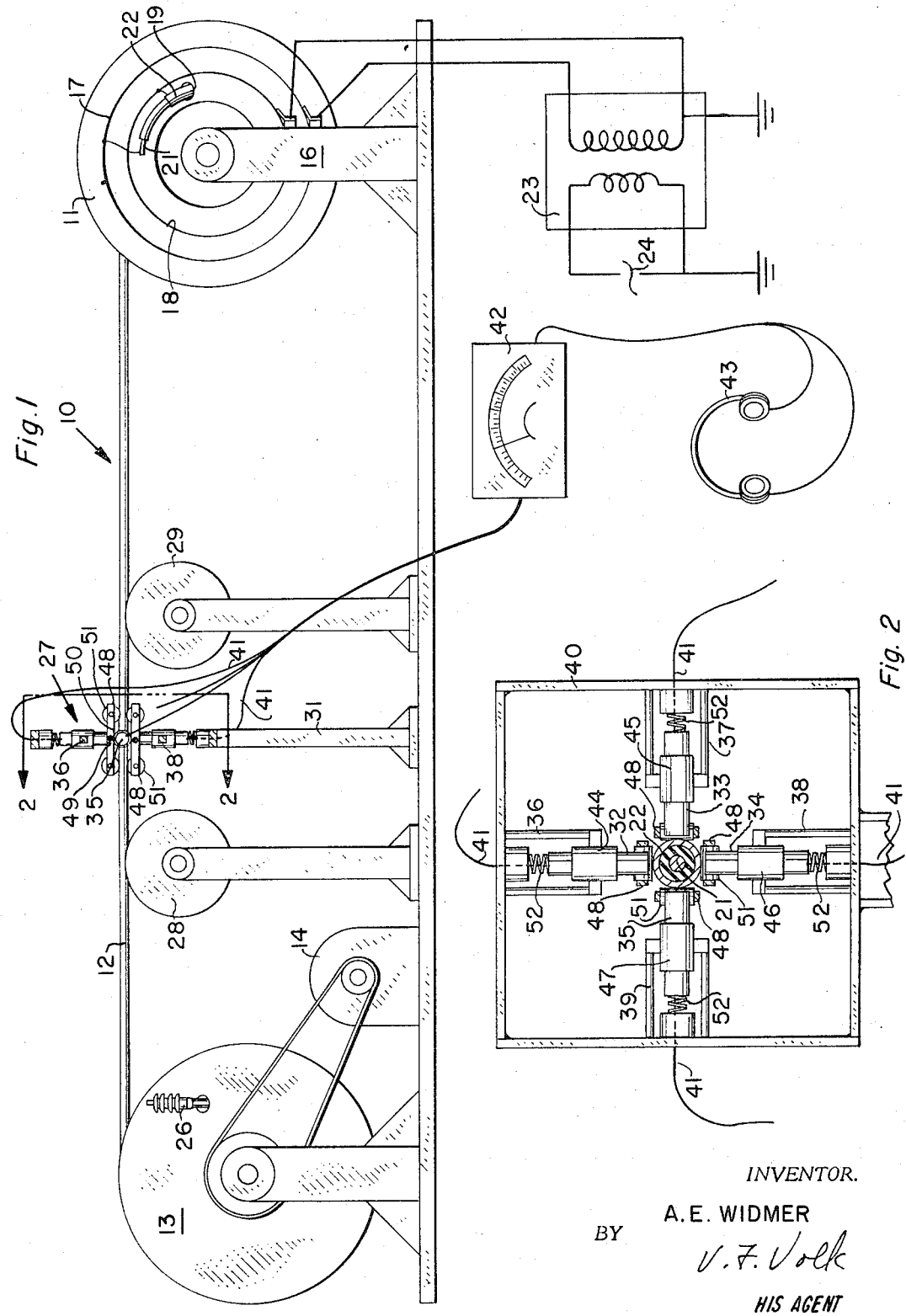

3,370,226
ULTRASONIC CABLE INSULATION TESTING APPARATUS AND METHOD
Alfred B. Widmer, Croton-on-Hudson, N.Y., assignor to Anaconda Wire and Cable Company, a corporation of Delaware
Filed July 20, 1966, Ser. No. 566,672
6 Claims. (Cl. 324—54)

ABSTRACT OF THE DISCLOSURE

In the continuous testing of electric cables for the detection of corona discharges within the insulation, a high voltage is applied between the conductor and shield of the cable while it is passed through a zone containing ultrasonic sound detectors.

---

My invention relates to the testing of electric cables and particularly to the continuous testing of said cables by means of apparatus responsive to high-frequency sound waves.

It has been known to test electrical cables by means of radio-frequency detectors responsive to the radio-frequency components of the corona discharges that occur when high electrical potentials are applied across any voids in the cable insulation. Particularly this test method has been applied in the manufacture of high voltage cables by passing the cables, with their conductors grounded, lengthwise through a water bath maintained at a potential sufficiently high to generate corona discharges at any voids in the insulation. As each section of the cable is introduced to the electrical field it is tested and the location of any fault is determined by identifying the section of the cable that is being tested when a corona discharge occurs. This method is satisfactory for testing cable cores in an early stage of manufacture, before the outer shielding or any outer conductor is applied. But for testing a completed cable, if a test voltage is applied between the inner and outer conductors, it can be determined by the known methods whether or not the cable is faulty as a whole, but the fault, itself, cannot be pinpointed.

I have invented an apparatus and method for using corona generation to locate faults in shielded or concentric cables. My apparatus comprises means for applying a high electrical potential between the conductor and shield of the cable, a test zone, and means for advancing the cable through the zone. There is testing means responsive to high frequency sound waves within the test zone which is preferably responsive to sound frequencies in a range of about 30 kc./s. (kilocycles per second) to about 60 kc./s. and is not responsive to sound frequencies substantially outside of this range.

My method for testing the insulation of an electric cable having a conductor, insulation surrounding the conductor, and a conducting layer surrounding the insulation comprises applying an electrical test potential between the conductor and the surrounding conducting layer sufficient to generate corona discharges at any faults in the insulation. It also comprises passing the cable lengthwise through a test zone comprising indicating means responsive to high frequency sound waves. The indicating means is preferably responsive to sound frequencies in a range of about 30–60 kc./s. and not responsive to sound frequencies substantially outside of this range. My apparatus may advantageously comprise roller support means for the testing means, with the roller means following the surface of the cable and supporting the testing means at a constant distance from the cable surface.

A more thorough understanding of my invention can be gained from the appended drawing.

In the drawing:
FIGURE 1 shows a diagrammatic representation of the apparatus of my invention.
FIGURE 2 shows a section through the lines 2—2 of FIGURE 1.

In the figures an apparatus indicated generally by the numeral 10 comprises a reel 11 of a shielded power cable 12 being tested and a reel 13 driven by a motor 14 for taking up the cable 12. The reel 11 mounted on a reel stand 16 is provided with slip rings 17, 18 and the cable 12, brought out through a hole 19 in the reel flange, has its conductor 21 electrically connected to the slip ring 17 and its shield 22 electrically connected to the grounded slip ring 18. The slip rings 17, 18 are connected across the secondary of a high-voltage transformer 23 connected to a 60 cycle power source 24. Although I prefer a 60 cycle power source because of its convenience and because standards for testing cables have been established for 60 cycles, D.C. or other frequencies of testing remote from the ultrasonic range also come within the scope of my invention. It will be understood that the leading end of the cable 12 on the reel 13 should be protected from flashover. This can be accomplished by an oil-filled termination such as a termination 26 shown in the figures. In passing from the reel 11 to the reel 13 the cable 12 passes through a testing zone 27 within which it is guided by sheaves 28 and 29. Within the testing zone 27 mounted on a support 31 are four ultrasonic detectors 32, 33, 34, 35, responsive to high frequency sound waves, connected to the support 31 by respective clamps 36, 37, 38, 39, within a frame 40. The detectors 32–35 are connected by the lines 41 to a visual indicator 42 and to earphones 43. Suitable detecting and indicating equipments for high-frequency sound waves are known, such as the Delcon Ultrasonic Translator Detector made by the Delcon Division of Hewlett Packard of Palo Alto, Calif. This equipment is sensitive to sound frequencies between 36 kc./s. and 44 kc./s. and I prefer detection units responsive to frequencies between 30 kc./s. and 60 kc./s. but not substantially outside of this range, so as to eliminate interference from extraneous sources.

To support the detectors 32–35 as closely as possible to the cable and still avoid a direct physical contact which would result in frictionally produced high frequency vibrations, the clamps 36–39 comprise respective bushings 44, 45, 46, 47 within which the detectors 32–35 can slide smoothly. To the end of each of the detectors 32–35 there is attached a roller assembly 48 by means of a set-screw 49. The roller assemblies 48 each comprise a frame 50 and two rolls 51 advantageously made of a plastic material such as phenolformaldehyde. The detectors 32–35, with the roller assemblies 48 attached, are urged toward the cable 12 by springs 52 acting against the frame 40.

In the practice of my invention the shielded cable 12, stored on the reel 11, passes through the testing zone 27 and between the detectors 32–35, to be taken up on the reel 13. A voltage is applied to the cable by means of the transformer 23 during the testing and its magnitude depends on the voltage for which the cable will be used. As an example, cable intended for 20,000 volt service to ground might be tested for corona at 22,000 volts. When the voltage is initially applied between the conductor 21 and shield 22 corona discharges will, of course, be created at any ionized voids at any point along the length of the cable. The response of the indicator 42 and the sound in the earphones 43 will reach a maximum for any particular fault when that fault passes between the detectors 32–35 and thus pin-point the exact location of the fault.

I have invented a new and useful apparatus and method for testing electric cables for which I desire an award of Letters Patent.

I claim:
1. Apparatus for testing insulation faults in an electric cable comprising:
   (A) means for applying a high electrical potential across said insulation sufficient to initiate corona discharge in said faults,
   (B) a test zone, said electrical potential being applied across said insulation within said test zone,
   (C) testing means responsive only to ultrasonic sound waves resulting from said corona discharge within said test zone, and
   (D) means for advancing said cable through said test zone, the insulation of said cable being subjected to said potential within said test zone.

2. Apparatus for testing insulation faults in a shielded electric cable comprising:
   (A) means for applying a high electrical potential between the conductor and shield of said cable sufficient to initiate corona discharge in said faults,
   (B) a test zone,
   (C) means for advancing said cable through said test zone, and
   (D) testing means responsive only to ultrasonic sound waves resulting from said corona discharge within said test zone.

3. The apparatus of claim 2 wherein said testing means is responsive to sound frequencies in a range of about 30 kc./s. to about 60 kc./s. and is not responsive to sound frequencies substantially outside of said range.

4. The method for testing the insulation of an electric cable having a conductor, insulation surrounding said conductor, and a conducting layer surrounding said insulation comprising:
   (A) applying an electrical test potential between said conductor and said conducting layer, said potential being sufficient to generate corona discharges at faults in said insulation, and
   (B) passing said cable lengthwise through a test zone comprising indicating means responsive only to ultrasonic sound waves resulting from said corona discharges within said test zone.

5. The method of claim 4 wherein said indicating means is responsive to sound frequencies in a range of about 30 kc./s. to about 60 kc./s. and is not responsive to sound frequencies substantially outside of said range.

6. The apparatus of claim 2 comprising roller support means for said testing means, said roller means following the surface of said cable and supporting said testing means at a constant distance from said surface.

References Cited

UNITED STATES PATENTS

| | | | |
|---|---|---|---|
| 1,917,087 | 7/1933 | Blume et al. | 324—54 X |
| 2,518,518 | 8/1950 | Beldi | 324—54 |
| 2,882,491 | 4/1959 | Gooding | 324—54 |
| 3,156,863 | 11/1964 | Wakefield | 324—54 |

OTHER REFERENCES

Ultrasonic Translator Detector, Models 116, 117, and 118, Hewlett Packard Delcon Division Product Bulletin 6–108, 6 pages, 1965.

Moffett, T. R.: Device Spots Radio Interference Quickly, Electrical World, Jan. 10, 1966, p. 62.

Krueger: Scanning of Screened Plastic Cores for Discharges, IEE Paper No. 3904M, June 1962, p. 129–133.

RUDOLPH V. ROLINEC, *Primary Examiner.*

G. R. STRECKER, *Assistant Examiner.*